United States Patent
Yang et al.

(10) Patent No.: US 9,520,917 B2
(45) Date of Patent: Dec. 13, 2016

(54) ANTENNA CONFIGURATION TO FACILITATE NEAR FIELD COUPLING

(75) Inventors: Songnan Yang, San Jose, CA (US); Anand S. Konanur, San Jose, CA (US); Bin Xiao, San Ramon, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 13/977,041

(22) PCT Filed: Feb. 13, 2012

(86) PCT No.: PCT/US2012/024892
§ 371 (c)(1),
(2), (4) Date: May 1, 2014

(87) PCT Pub. No.: WO2013/122565
PCT Pub. Date: Aug. 22, 2013

(65) Prior Publication Data
US 2014/0346886 A1    Nov. 27, 2014

(51) Int. Cl.
*H01F 38/14* (2006.01)
*H01Q 1/36* (2006.01)
(Continued)

(52) U.S. Cl.
CPC ......... *H04B 5/0025* (2013.01); *G06K 19/0779* (2013.01); *G06K 19/07779* (2013.01);
(Continued)

(58) Field of Classification Search
CPC .............. G06K 19/07779; G06K 19/0779; H01F 38/14; H01F 2038/143; H01Q 1/2208; H01Q 1/2216; H01Q 1/36; H01Q 1/38; H01Q 7/00; H01Q 7/06; H01Q 7/08; H01Q 11/12; H01Q 11/14; H02J 5/005; H02J 7/025; H02J 17/00; H02J 50/00; H02J 50/10; H02J 50/12; H04B 5/0025; H04B 5/0031; H04B 5/0037; H04B 5/0075; H04B 5/0081; H04B 5/0087; H04B 5/0093; Y10T 29/49018
(Continued)

(56) References Cited

U.S. PATENT DOCUMENTS 5,682,098 A * 10/1997 Vij ..................... G01R 33/3415
324/318
2003/0063034 A1* 4/2003 Taniguchi ................ H01Q 1/22
343/700 MS (Continued)

FOREIGN PATENT DOCUMENTS

DE    102009038824 A1    3/2010
FR    2 865 329 A1    7/2005
(Continued)

OTHER PUBLICATIONS

Extended European Search Report received for European Patent Application No. 12868349.7, mailed on Sep. 17, 2015, 6 pages.
(Continued)

*Primary Examiner* — Levi Gannon
(74) *Attorney, Agent, or Firm* — Forefront IP Lawgroup, PLLC

(57) ABSTRACT

Described herein are techniques related to near field coupling and wireless power transfers. A portable device may include a coil antenna that includes an upper loop and a lower loop to form a figure-eight arrangement. The figure-eight coil antenna arrangement is wrapped against top and bottom surfaces of a component to establish near field coupling through front side, top side, bottom side, or corner side of the portable device. Further, a flux guide may be placed between the coil antenna and the component to facilitate magnetic flux at the upper loop and the lower loop
(Continued)

to induce current of the same phase during receive mode. During transmit mode, the flux guide facilitates the magnetic flux at the upper loop and the lower loop to generate magnetic fields of the same direction.

29 Claims, 8 Drawing Sheets

(51) Int. Cl.
*H01Q 7/08* (2006.01)
*H01Q 11/14* (2006.01)
*H02J 5/00* (2016.01)
*H04B 5/00* (2006.01)
*H01Q 7/00* (2006.01)
*H01Q 1/22* (2006.01)
*G06K 19/077* (2006.01)

(52) U.S. Cl.
CPC ........... *H01F 38/14* (2013.01); *H01Q 1/2216* (2013.01); *H01Q 1/36* (2013.01); *H01Q 7/00* (2013.01); *H01Q 7/08* (2013.01); *H01Q 11/14* (2013.01); *H02J 5/005* (2013.01); *H02J 50/10* (2016.02); *H04B 5/0031* (2013.01); *H04B 5/0037* (2013.01); *H04B 5/0081* (2013.01); *Y10T 29/49018* (2015.01)

(58) Field of Classification Search
USPC ........ 307/104; 343/788, 866, 867, 871, 895, 343/908
See application file for complete search history.

(56) References Cited

U.S. PATENT DOCUMENTS

| | | |
|---|---|---|
| 2004/0257295 A1 | 12/2004 | Tada |
| 2008/0272966 A1 | 11/2008 | Qi et al. |
| 2009/0009415 A1 | 1/2009 | Tanska et al. |
| 2009/0189729 A1* | 7/2009 | Kubo ............... G06K 19/07749 336/221 |
| 2010/0127938 A1 | 5/2010 | Ali et al. |
| 2010/0309081 A1 | 12/2010 | Kobayashi et al. |
| 2013/0271073 A1 | 10/2013 | Yang et al. |

FOREIGN PATENT DOCUMENTS

| | | |
|---|---|---|
| WO | 2007/080214 A1 | 7/2007 |
| WO | 2011/077877 A1 | 6/2011 |
| WO | 2013/122565 A1 | 8/2013 |

OTHER PUBLICATIONS

International Preliminary Report on Patentability and Written Opinion received for PCT Patent Application No. PCT/US2012/024892 mailed on Aug. 28, 2014, 7 pages.
International Search Report and Written Opinion received for PCT Patent Application No. PCT/US2012/024892, mailed on Oct. 24, 2012, 11 pages.
Yang, et al., "Coil and Ferrite Configuration to Facilitate Near Field Coupling", U.S. Appl. No. 13/976,067, filed on Dec. 21, 2011, 22 pages.

* cited by examiner

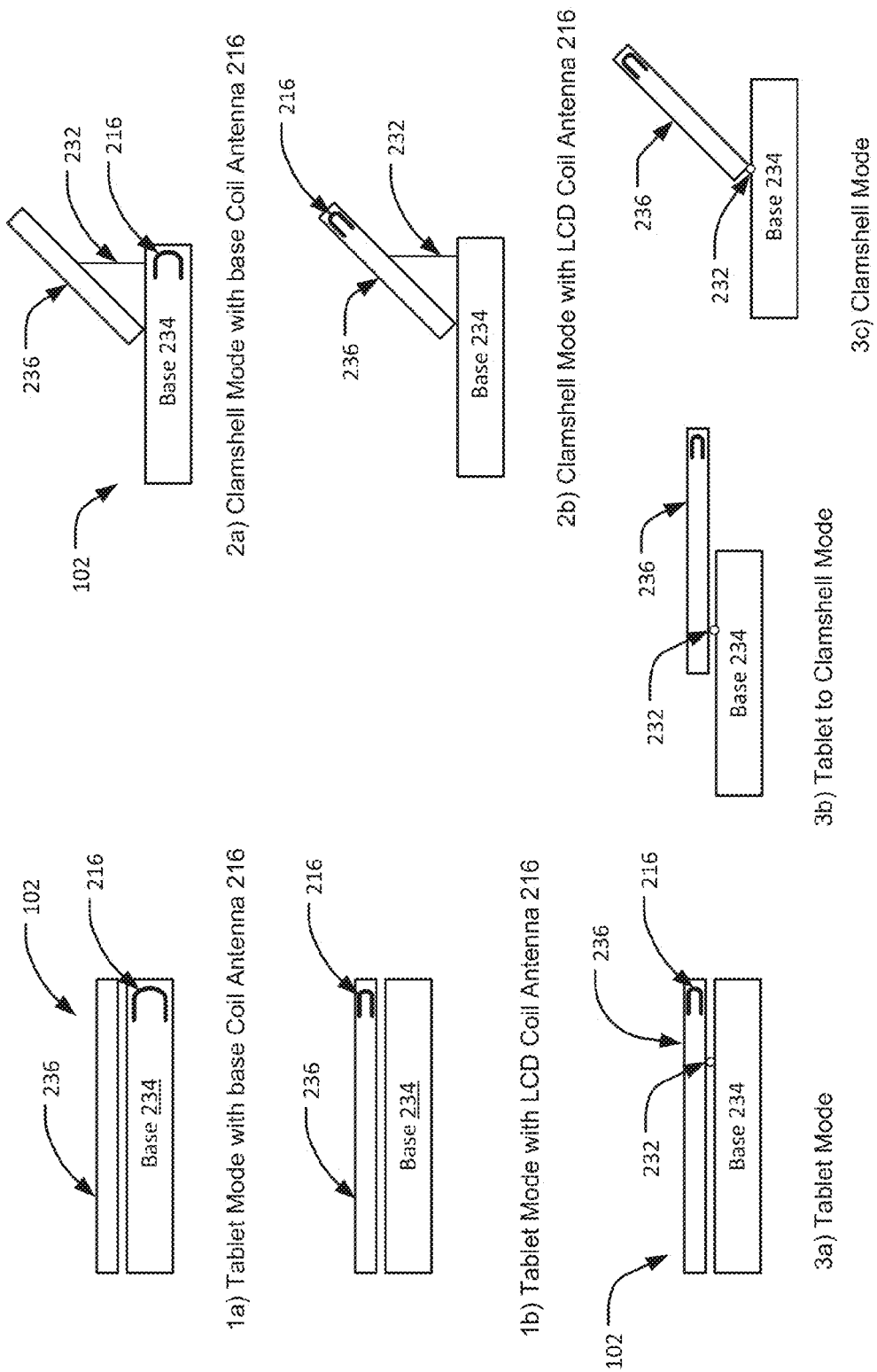

ANTENNA CONFIGURATION TO FACILITATE NEAR FIELD COUPLING

BACKGROUND

Recently, technologies have arisen that allow near field coupling (such as wireless power transfers (WPT) and near field communications (NFC)) between electronic devices in close proximity to each other and more particularly, thin portable electronic devices. Both near field coupling functions use radio frequency (RF) antennas in each of the devices to transmit and receive electromagnetic signals. Because of user desires (and/or for esthetic reasons) many of these portable devices are small (and becoming smaller), and tend to have exaggerated aspect ratios when viewed from the side. As a result, many of these thin portable devices incorporate flat antennas, which use coils of conductive material as their radiating antennas for use in near field coupling functions.

A conventional NFC antenna configuration in the thin portable devices includes a limited operational function. For example, the thin portable device is limited to share information through the back side of the thin portable device. Accordingly, an antenna configuration may be implemented to establish NFC and/or WPT in multiple directions to provide user convenience in case of information transfer between portable devices.

BRIEF DESCRIPTION OF THE DRAWINGS

FIG. 2C illustrates an example coil antenna configuration in a convertible portable device.

FIG. 3A (2) is a top or flat view of the figure-eight coil antenna arrangement.

FIG. 3B (2) is a cross-sectional view of the figure-eight coil antenna arrangement.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling antennas of devices and more particularly for coupling coil antennas of thin portable electronic devices for improving near field coupling capabilities of the devices. Near field coupling includes (by way of illustration and not limitation) wireless power transfer (WPT) and/or near field communications (NFC) capabilities of the portable devices. For example, the portable device includes a continuous loop of coil antenna that contains an upper loop and a lower loop to form a figure-eight arrangement. In this example, the upper loop includes an opposite sense of rotation as against the lower loop. In an implementation, the figure-eight coil antenna may be folded horizontally at least at the middle of the figure-eight arrangement, and wrapped against at least two surfaces (e.g., top and bottom surfaces) of a component (e.g., metallic component) in the portable device. In this implementation, and during receiving mode by the portable device, currents induced at the upper loop and the lower loop of the figure-eight coil antenna may include the same phase. Similarly, during transmitting mode, magnetic fields that are generated by the figure-eight coil antenna may include the same direction. In other implementations, the figure-eight coil antenna may not include fold lines; however, the figure-eight coil antenna may be curved to fit the top and bottom surfaces of the component in the portable device. Further, a highly permeable flux guide (e.g., ferrite material) may be placed between the coil antenna and the component to facilitate magnetic flux to induce currents with the same phase during the receiving mode, and to generate magnetic fields of the same direction during transmitting mode. In other implementations, both ends of the ferrite material may be inserted through slots at the upper loop and the lower loop to improve performance.

Figure 1:
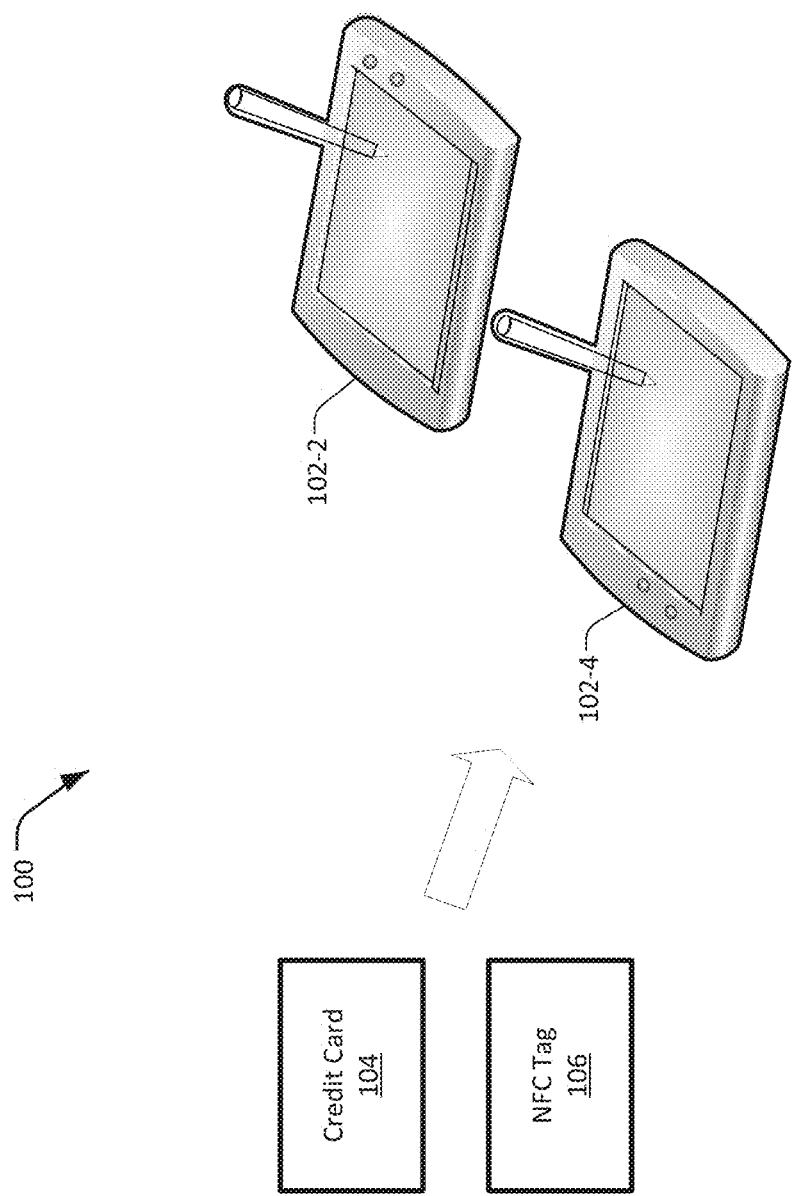
FIG. 1 illustrates portable devices in an example near field coupling arrangement.

FIG. 1 illustrates an example arrangement 100 of portable devices for near field coupling. More particularly, users may have a desire to operate near field coupling enabled portable electronic devices and/or other devices in certain ergonomically convenient manners. Examples of such portable devices include (but are not limited to) mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

In an implementation, FIG. 1 shows a so-called "NFC bump" where two users (not shown) "bump" their NFC-enabled portable devices 102-2 and 102-4 together in an edge-to-edge or head-to-head manner to perform NFC-related information sharing functions. In other implementations, a corner-to-corner (not shown), or a front-to-back (not shown), or a back-to-back (not shown) manner may be performed for the "NFC bump." FIG. 1 shows an often desired side-by-side arrangement of the portable devices 102 for NFC and/or WPT purposes. With conventional NFC-enabled devices, the near field coupling would be inefficient or ineffective because the mechanical integration of near field coupling components (e.g., antenna) in conventional devices constrains the ability of users to effectively employ the desired arrangements shown in FIG. 1. To this end, an antenna configuration may be implemented at the portable devices 102 to perform the "NFC bump" efficiently.

In an implementation, the portable devices 102 may include the antenna configuration to perform and/or establish near field coupling through front side, or top side, bottom side, or corner side of the portable devices 102. For example, the portable device 102-2 may establish NFC and/or WPT when the portable device 102-4 is placed on top of the portable device 102-2. In this example, the portable device 102-2 may receive information (e.g., data packets) from the portable device 102-4 through the established NFC. Further, the portable device 102-2 may charge power to the portable device 102-4 through the front side of portable device 102-2. Similarly, the portable device 102-4 may establish NFC and/or WPT when the portable device 102-2 is placed on top of the portable device 102-4. The above example for establishing NFC and/or WPT through the front side of the portable devices 102 may similarly apply to the top side, bottom side or corner side operations. In other implementations, the portable devices 102 may accept information from a credit card 104 (or other similar device) when the credit card 104 is placed at front side (i.e., above the screen), back side (i.e., rear side), or corner side of the portable devices 102. In other implementations, the portable devices 102 may accept information from a NFC tag 106 when the NFC tag 106 is placed at front side (i.e., above the screen), back side (i.e., rear side), or corner side of the portable devices 102.

Example of Partially Disassembled Portable Device

Figure 2A:
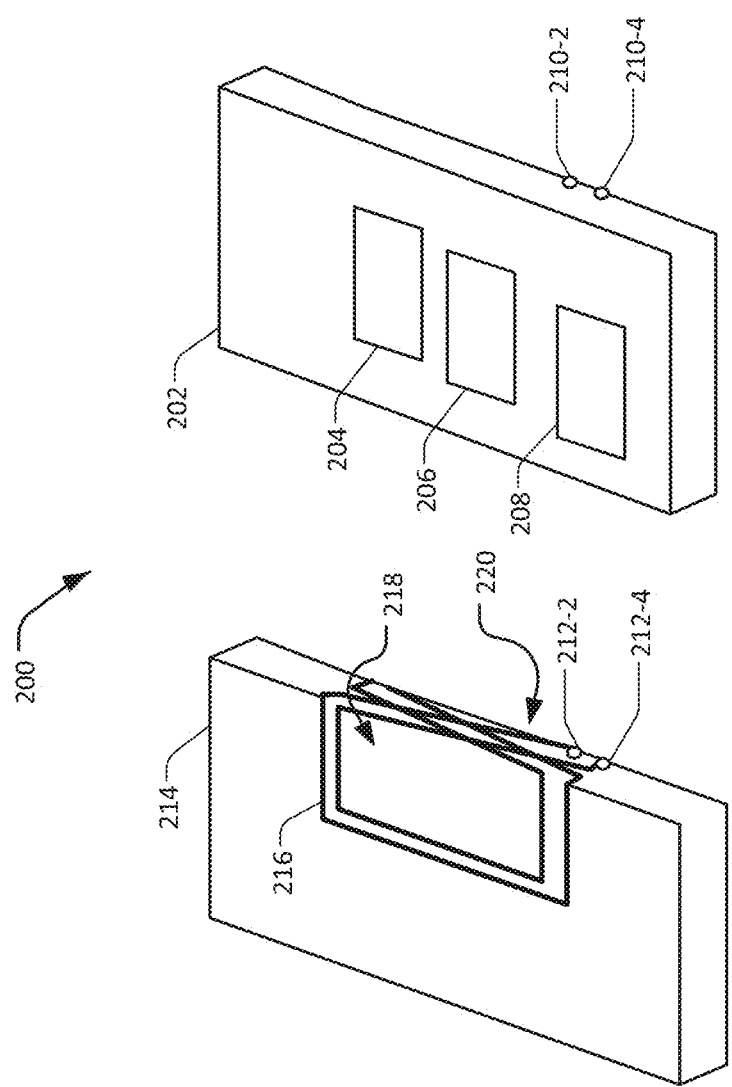
FIG. 2A illustrates a top plan view of a partially disassembled portable device.

FIG. 2A illustrates a top plan view 200 of a partially disassembled portable device 102. The emerging technologies related to near field coupling enable many appealing experiences for users of the portable device 102. For example, the portable device 102 may include a wrapped coil antenna in its design, so that (in part) the portable device 102 may possess the thin aspect ratios and small form factors sought by users. Moreover, the wrapped coil antenna may allow for comparative ease in mechanical integration into the thin portable device 102 (when considering mechanical factors in isolation from other considerations such as, the ability of the coils of other portable devices 102 to couple with one another). For instance, integrating a flexible printed circuit (FPC), which incorporates the coil antenna, into a thin portable device 102 may minimize the increase in the thickness of the portable device 102.

With continuing reference to FIG. 2A, the drawing illustrates an example device 202 that includes a housing of at least two surfaces (e.g., two parallel surfaces). Between the two parallel surfaces may contain metallic components at the portable device 102. For example, the metallic components may include a battery 204, a mother board 206, and a camera 208. Other metallic components such as a heat sink hardware, printed circuit boards, processor(s), hard drives, memory, etc. may be included at the device 202. Further, a contact point 210 may be used to establish electrical connection through a contact point 212 at a device 214. For example, induced currents during receive mode at the device 214 may be transmitted for processing (e.g., amplification) at the device 202 through the contact points 210 and 212. In other implementations, the at least two surfaces of the housing in the device 202 may include a top surface and a bottom surface that may not necessarily be parallel to each other, or contain the metallic components. For example, the top surface and the bottom surface may define an acute angle that is located at an edge of the portable device 102.

In an implementation, the device 214 may include a continuous loop of coil antenna 216 that is mounted on, embedded in, or otherwise associated with the device 214. The coil antenna 216 may include a dedicated antenna for NFC and/or WPT purposes. In other words, the coil antenna 216 may be configured to operate on a separate resonant frequency (e.g., 13.56 MHz to implement NFC and/or WPT operations), and independent from another antenna that uses standard frequencies used in wireless communications (e.g., 5 GHz for WiFi signals). The coil antenna 216 may include an upper loop 218 and a lower loop 220. The coil antenna 216 may form a figure-eight (i.e., physically similar to numerical figure "8") with the upper loop 218 in opposite sense of rotation with the lower loop 220. The upper loop 218 and the lower loop 220 may include multiple inner loops to form the figure-eight (e.g., two loops). Since the coil antenna 216 is a continuous loop, the upper loop 218 and the loop 220 do not intersect physically at the middle of the figure-eight configuration; however, the upper loop 218 and the lower loop 220 may be located in different layers (i.e., no electrical point of contact other than point of termination) at least at the middle of the figure-eight where fold lines are located. The fold lines may be defined by at least two edges of the at least two surfaces in the device 202. In other implementation, the fold lines may not be present or visible at all (e.g., a letter "U" configuration for the coil antenna 216).

In an implementation, the coil antenna 216 may include a flux guide (not shown) to guide or lead magnetic flux to the upper loop 218 or the lower loop 220 depending upon which loop (i.e., lower loop 220 or upper loop 218) is receiving the magnetic fields (not shown). For example, the magnetic flux is guided by the flux guide from the upper loop 218 to penetrate and exit at the lower loop 220, or vice-versa. The flux guide (not shown) may include a highly permeable material (e.g., ferrite material) that may be embedded in or mounted between the coil antenna 216 and the device 202. In other implementations, the flux guide may be inserted through the coil antenna 216 to improve performance as discussed in FIG. 4.

Figure 2B:
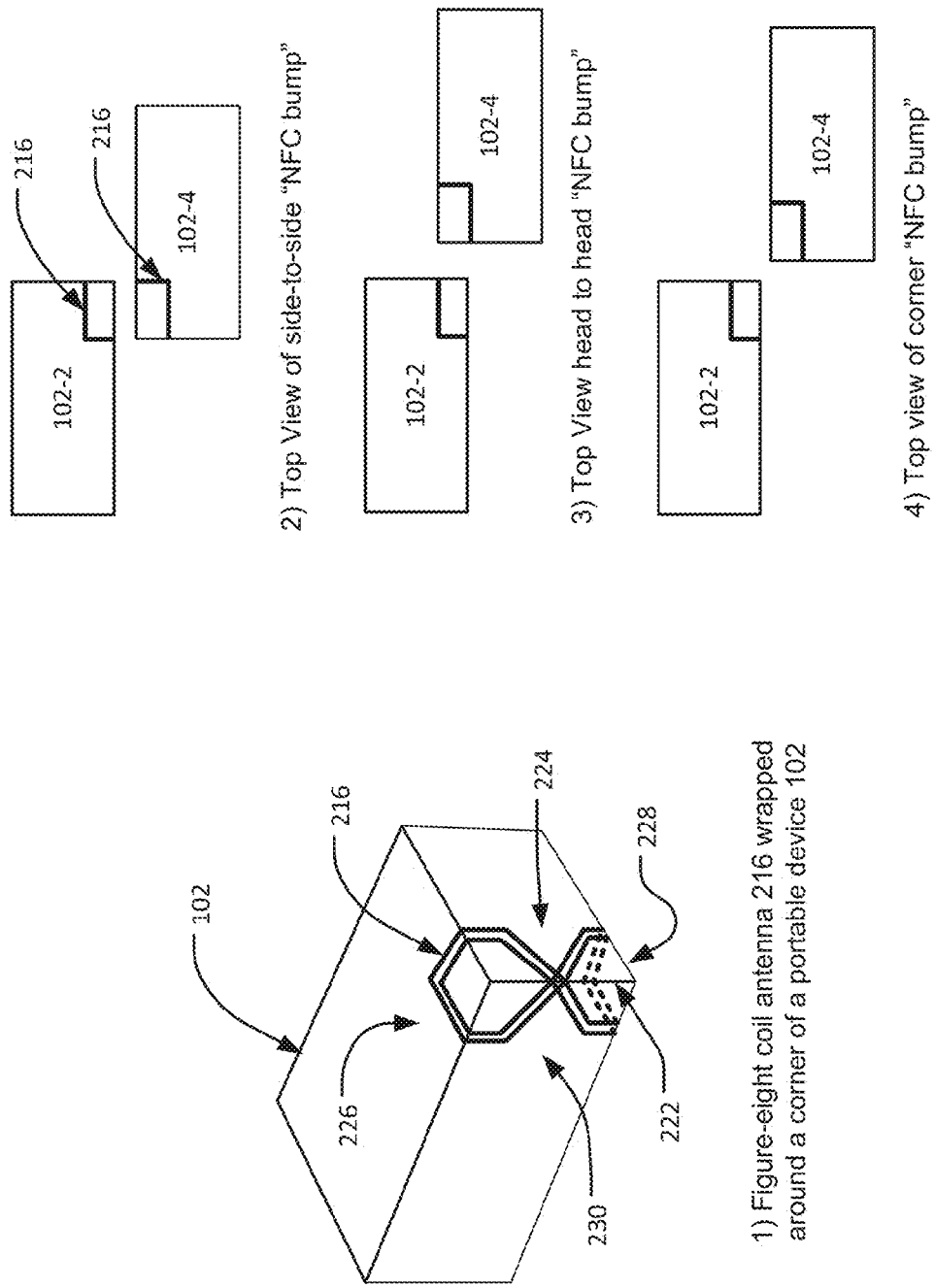
FIG. 2B illustrates an example coil antenna configuration in a portable device.

FIG. 2B (1) illustrates another implementation of wrapping the coil antenna 216 at the portable device 102. For example, the figure-eight coil antenna 216 may be wrapped around a corner side 222 of the portable device 102 to support NFC operation through front side 224, top side 226, bottom side 228, right side 230, or the corner side 222 of the portable device 102. In this example, the coil antenna 216 may cover not only primary edges (e.g., front side 224, top side 226, bottom side 228, or right side 230) of the portable device 102, but also a secondary edge (e.g., corner side 222) of the portable device 102. FIGS. 2B (2), 2B (3), and 2B (4) illustrate top-view for side-to-side "NFC bump," head-to-head "NFC bump," and corner-to-corner "NFC bump." respectively. The coil antenna 216 that is wrapped around the corner side 222 of the portable device 102 may allow the "NFC bump" as shown FIGS. 2B (2), 2B (3), and 2B (4) configurations.

FIG. 2C illustrates wrapping configurations for the coil antenna 216 in a convertible portable device 102. The convertible portable device 102 may be used in a tablet mode (e.g., touch screen operation) or in a clamshell mode, which resembles a conventional laptop computer with a hinge 232. In an implementation, the figure-eight coil antenna 216 may be wrapped around an edge or corner of a base 234, or around an edge or corner of a liquid crystal display (LCD) screen or screen 236 of the portable device 102. For example, FIG. 2C 1a illustrates the coil antenna 216 that may be wrapped around connectors (not shown), mother board (not shown), etc. at the base 234 of the portable device 102. Similarly, FIG. 2C 1b illustrates the coil antenna 216 that may be wrapped around the LCD panel (not shown) at top edge or corner of the screen 236. The wrapped coil antenna 216 around the base 234 or around the screen 236 may allow reading (e.g., NFC tag 106 or credit card 104 reading) at top side and bottom side in a tablet mode as shown in FIGS. 2C 1a and 1b. Wrapping the coil antenna 216 at a corner (e.g., corner 222) of the base 234 or the screen 236 may allow two convertible notebooks (i.e., portable devices 102) to perform the NFC "bump" in tablet modes as shown in FIGS. 2B (2 to 4) in sharing information between the portable devices 102. On the other hand, the wrapped coil antenna 216 around the base 234 or around the screen 236 may allow reading (e.g., NFC tag 106 or credit card 104 reading) at front side and back side in a clamshell mode as shown in FIGS. 2C 2a and 2C 2b. FIGS. 2C 3a-3c demonstrate the portable device 102 at the tablet mode (i.e., FIG. 2C 3a) that is converted into the clamshell mode (i.e., FIG. 2C 3c).

Example Coil Antenna Configuration

Figure 3A:
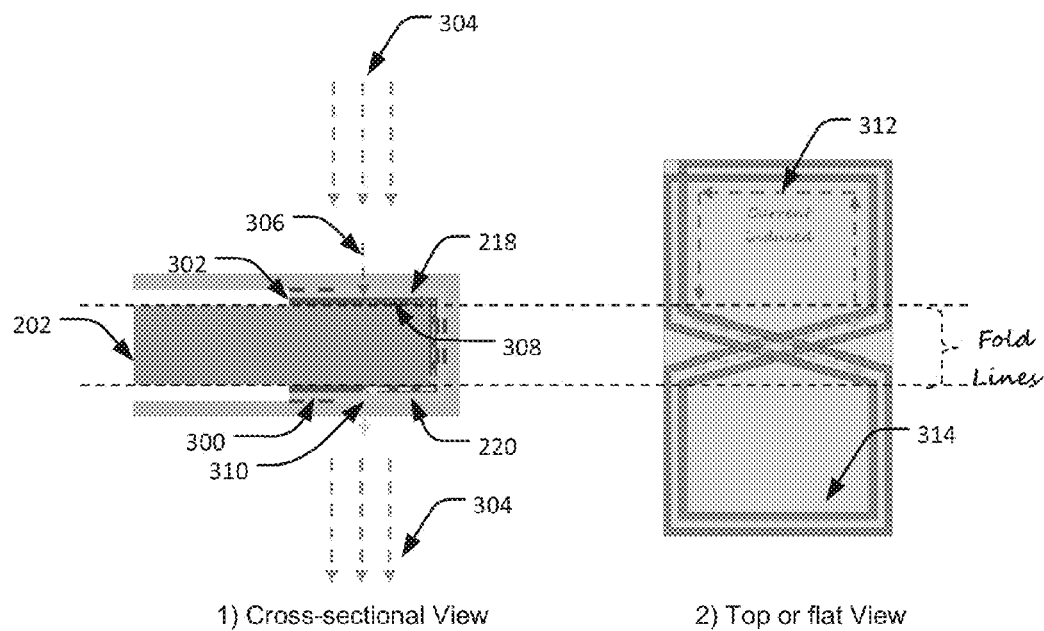
FIG. 3A (1) is a cross-sectional view of a figure-eight coil antenna arrangement at receive mode.
Figure 3B:
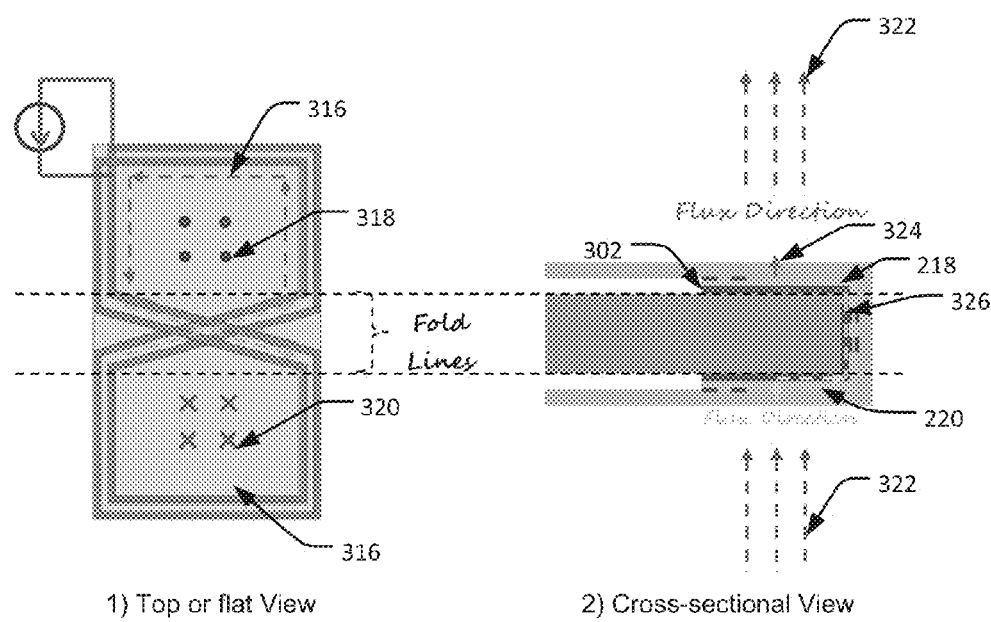
FIG. 3B (1) is a top or flat view of a figure-eight coil antenna arrangement at transmit mode.

FIGS. 3A and 3B illustrate an exemplary figure-eight coil antenna configuration to facilitate near field coupling. FIG. 3A (1) is a cross-sectional view of the figure-eight coil antenna 216. The figure-eight coil antenna 216 may include the upper loop 218 and the lower loop 220. The cross-sectional view may include a FPC substrate 300 (that includes the coil antenna 216), a flux guide 302 (e.g., ferrite sheet), and the device 202 (e.g., metallic component). The FPC substrate 300 may contain the coil antenna 216 to provide flexibility and space savings. FIG. 3A (2) is a top or flat view of the coil antenna 216 at receive mode.

In an implementation, FIGS. 3A (1) and 3A (2) illustrate an operation of the coil antenna 216 at receive mode or as part of a receiver in the portable device 102 (e.g., portable device 102-2). For example, the portable device 102-2 is subjected to an external magnetic field 304 that is generated by another portable device 102 (e.g., portable device 102-4). In this example, the magnetic field 304 may penetrate the upper loop 218 at flux direction 306, and generate a magnetic flux 308 in the flux guide 302. The magnetic flux 308 may include the magnetic field 304 that entered or is captured by the flux guide 302. The flux guide 302 may facilitate or guide the magnetic flux 308 from the upper loop 218 to the lower loop 220. The guided magnetic flux 308 at the flux guide 302 may exit through the lower loop 220 by penetrating the lower loop 220 at flux direction 310.

With continuing reference to FIG. 3A (2), the magnetic flux 308 may induce a current 312 at the upper loop 218 that is flowing in a counter-clockwise direction (according to Lentz's law). Similarly, the guided magnetic flux 308 at the lower loop 220 may generate a current 314 at a clockwise direction. Accordingly, the currents 312 and 314 that may be generated by the same magnetic field 304 may add in phase, which may result in an improved coupling between the transmitting coil antenna (not shown) of the portable device 102-4 and the coil antenna 216.

In an implementation, FIGS. 3B (1) and 3B (2) illustrate an operation of the coil antenna 216 at transmit mode or as part of a transmitter in the portable device 102 (e.g., portable device 102-2). For example, the portable device 102-2 is trying to establish NFC with another portable device 102 (e.g., portable device 102-4). In this example, a current 316 may be injected by a transmitter circuitry (not shown) at the upper loop 218 and the lower loop of the coil antenna 216 that is acting as a transmitting antenna. The injected current 316 may generate a combined magnetic field from the upper loop 218 and the lower loop 220. To illustrate, the magnetic field at the upper loop 218 may include a direction that is pointing out of the page 318, while the current 316 that is flowing at the lower loop 220 may include a direction that is pointing into the page 320. After folding the coil antenna 216 around the edge of the device 202 (i.e., as shown by cross-sectional view in FIG. 3B (2)), the current 316 may generate magnetic field 322. The magnetic field 322 may flow at flux direction 324. In this implementation, the flux guide 302 may link the magnetic field 322 that is generated by the upper loop 218 and the lower loop 220 by guiding magnetic flux 326 along the edge of the device 202. Accordingly, the combined magnetic field at the upper loop 218 and the lower loop 220 is stronger than the magnetic field that may be generated by only half (e.g., upper loop 218 only) of the coil antenna 216.

Figure 3C:
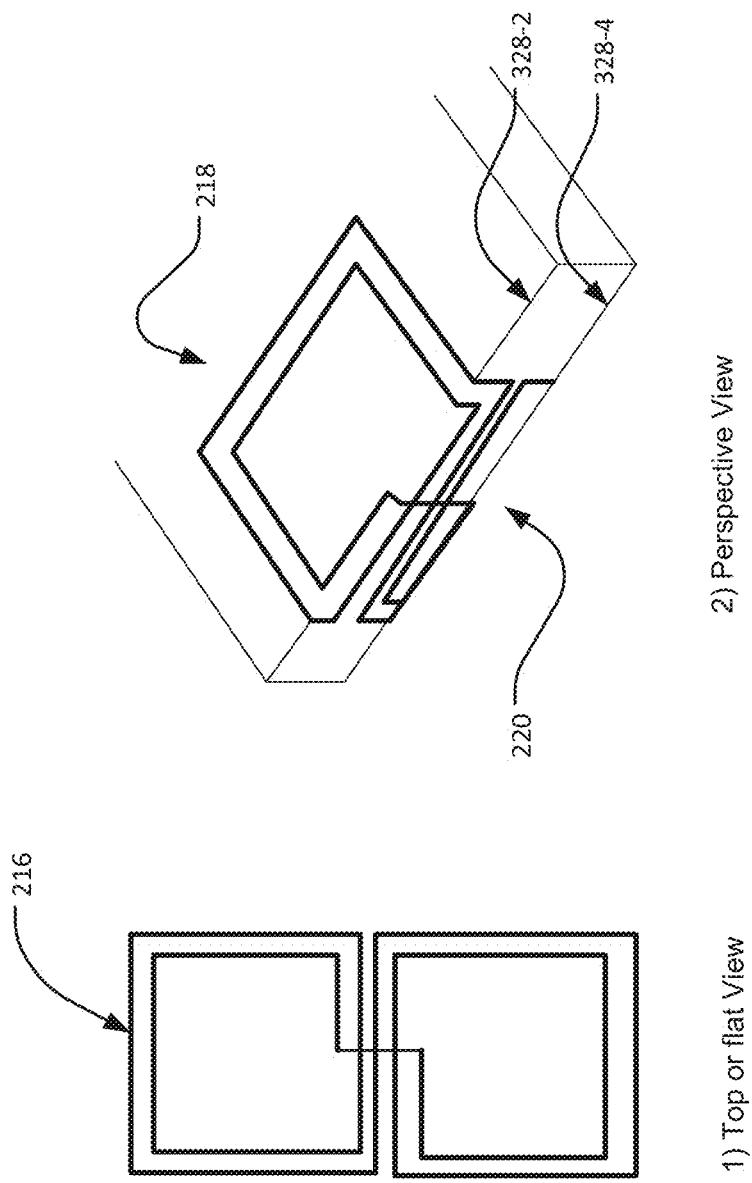
FIG. 3C is an example figure-eight coil antenna arrangement.

FIG. 3C illustrates another embodiment for the figure-eight coil antenna 216 configuration. In an implementation, the coil antenna 216 may form the figure-eight arrangement by containing ninety (90) degree angles at least along the fold lines 328 that are located between the upper loop 218 and the lower loop 220. In this implementation, the operation during transmit mode and receive mode as discussed in FIGS. 3A and 3B above is similarly applied. For example, the induced current 312 at the upper loop 218 includes a current that is opposite in opposite in direction as against another induced current 314 at the lower loop 220.

Example Flux Guide Configuration

Figure 4:
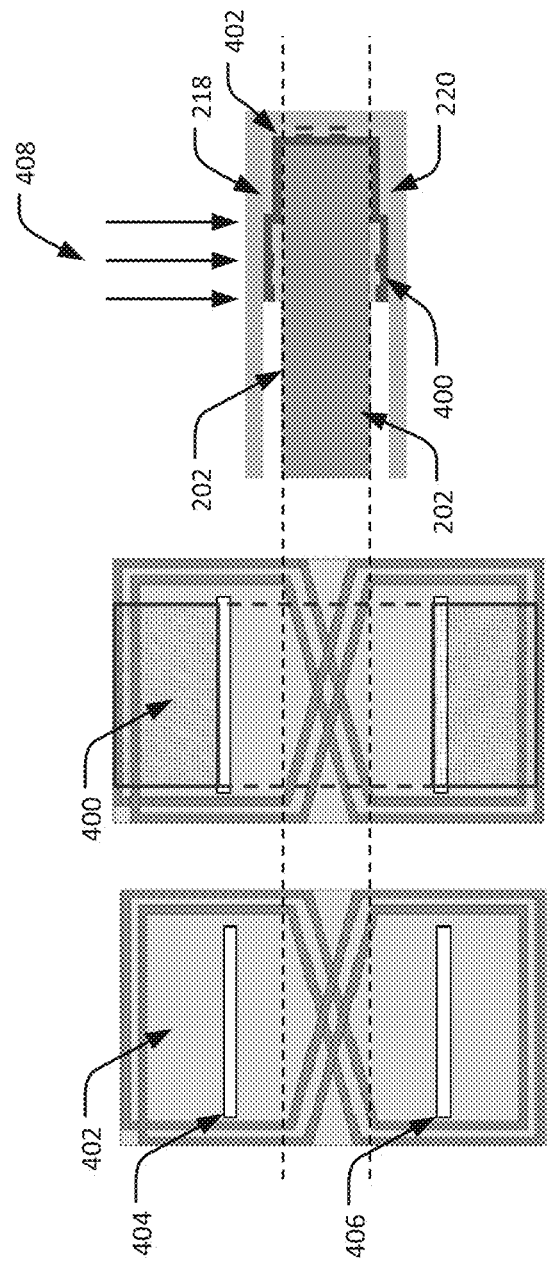
FIG. 4 illustrates an example flux guide arrangement for near field coupling.

FIG. 4 illustrates another embodiment of the figure-eight coil antenna 216 to facilitate near field coupling. In an implementation, a ferrite sheet 400 is inserted through a FPC substrate 402 that includes the coil antenna 216. For example, the FPC substrate 402 is configured to include a slot 404 at the upper loop 218, and a slot 406 at the lower loop 220. In this example, the slots 404 and 406 may include a small opening such that, both ends of the ferrite sheet 400 is placed on top of the FPC substrate 402 (i.e., the same side of the coil antenna 216) and the device 202. The plane defined by connecting the slots 204 and 206 in FIG. 4a may include portions of the ferrite sheet 400 that is embedded between the FPC substrate 402 (i.e., other side of the coil antenna 216) and the device 202. As compared to the flux guide 302 (i.e., flat ferrite sheet) in FIG. 3A (1), the incident magnetic field 304 in the FIG. 3A (1) has to penetrate the upper loop 218 to be captured at the flux guide 302. The flux guide 302 may capture a portion of the magnetic field 304; however, not all of the magnetic field 304 may penetrate the upper loop 218 to enter the flux guide 302. With ferrite sheet 400 insert configuration, the ferrite sheet 400 may guide all magnetic fields 408 that are received through the portion of the ferrite sheet 400 that is placed on top of the FPC substrate 402. The received magnetic fields 408 are guided by the ferrite sheet 400 through the lower loop 220 such that, the amount of current induced (not shown) is maximized. Hence, a higher coupling between the transmitter (not shown) and the coil antenna 216 is achieved.

Example Process

Figure 5:
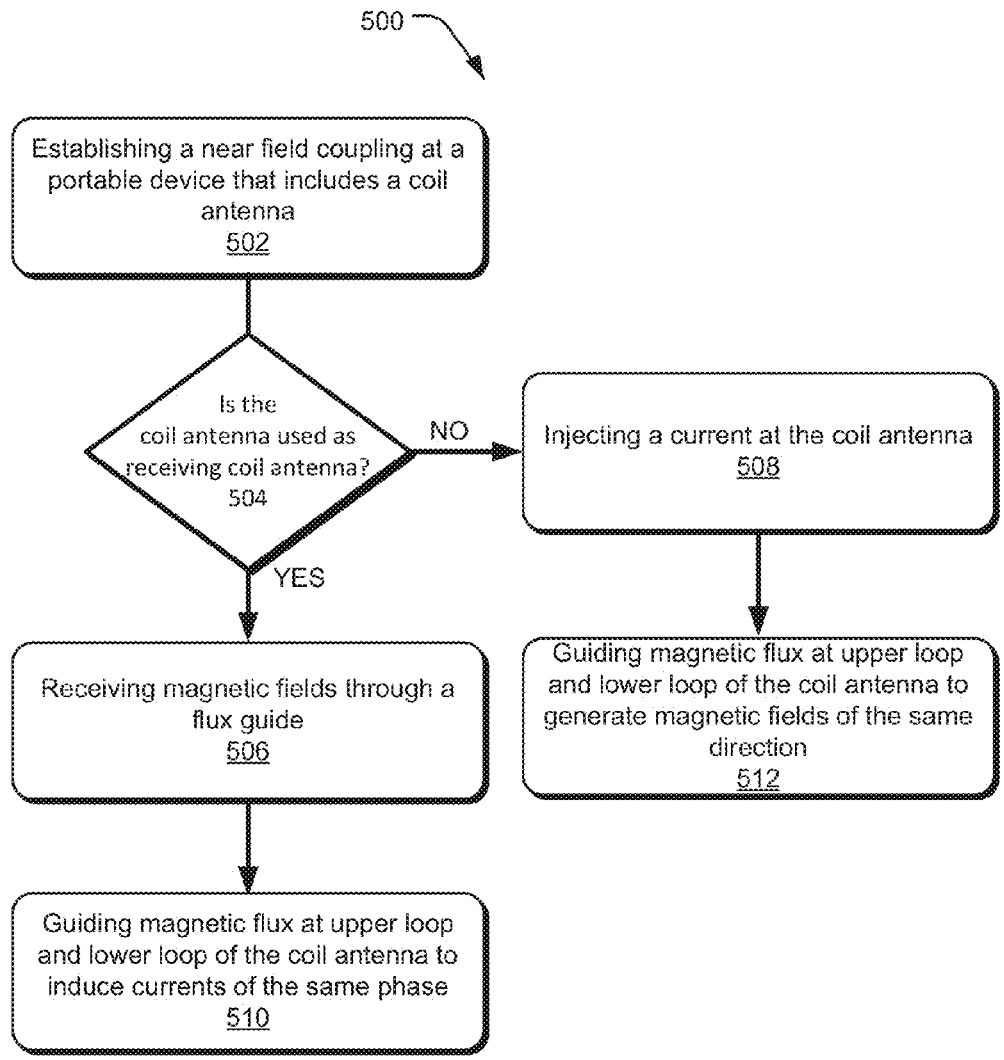
FIG. 5 is a method for coupling a portable device to facilitate near field coupling.

FIG. 5 shows an example process chart illustrating an example method for coupling a portable device to facilitate near field communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, establishing a near field coupling at a portable device is performed. In an implementation, a first portable device (e.g., portable device 102-2) may establish near field coupling with a second portable device (e.g., portable device 102-4) by placing the portable device 102-2 at front side (e.g., front side 224), top side (e.g., top side 226), bottom side (e.g., bottom side 228), right side (e.g., right side 230), or a corner side (e.g., corner side 222) of the portable device 102-4. In an implementation, the portable device 102-2 may include a coil antenna (e.g., coil antenna 216) that contains an upper loop (e.g., upper loop 218) and a lower loop (e.g., lower loop 220). The upper loop 218 may include an opposite sense of rotation as against the lower loop 220. The upper loop 218 and the lower loop 220 may include multiple loops or coils to form the figure-eight coil antenna 216 configuration. Further, the coil antenna 216 may be wrapped around a screen (e.g., screen 236), or around a base (e.g., base 234) of the portable device 102 that may be operated in a tablet mode, or in a clamshell mode.

At block 504, the coil antenna 216 may be used as a receiving coil antenna 216, or a transmitting coil antenna 216. For example, at receive mode such as, in block 506, the portable device 102-2 may receive magnetic fields (e.g., magnetic field 304) that are generated by another portable device 102-4. At transmit mode such as, in block 508, the portable device 102-2 may inject current (e.g., current 316) at the coil antenna 216 to generate a magnetic field (e.g., magnetic field 322). The portable device 102 may control transmit and receive operation of its radio component that includes the coil antenna 216; however, the coil antenna 216 is a passive device. In other words, the separation of the transmit mode and the receive mode at block 504 is made to help explain the working mechanism in the present implementation. In actual implementations, both transmit and receive operations may be implemented at the same time in the coil antenna 216.

At block 510, guiding magnetic flux to induce a current of the same phase is performed. In an implementation, during the receive mode, the magnetic field 304 may be captured by a flux guide (e.g., flux guide 302) to generate magnetic flux (e.g., magnetic flux 308). The flux guide 302 may facilitate the magnetic flux 308 from the upper loop 218 to penetrate and exit at the lower loop 220 of the portable device 102-4. The magnetic flux at the upper loop 218 may induce a current (e.g., current 312) that flows in counter clockwise direction. On the other hand, the facilitated magnetic flux 308 may induce another current (e.g., current 314) that flows in clockwise direction. Accordingly, the induced currents 312 and 314 are combined in phase by the coil antenna 216 to increase coupling coefficient between the transmitting coil antenna at the portable device 102-4, and the coil antenna 216 of the portable device 102-2.

In other implementations, a ferrite sheet (e.g., ferrite sheet 400) is inserted through slots (e.g., slots 404 and 406) of a FPC substrate (e.g., FPC substrate 402) to receive all magnetic fields (e.g., magnetic field 408) that are flowing through portion of the ferrite sheet 400 that is placed on top of the FPC substrate 402. The received magnetic fields 408 are guided by the ferrite sheet 400 through the lower loop 220 such that, the amount of current induced in this implementation is maximized.

At block 512, guiding magnetic flux to generate magnetic fields of the same direction is performed. In an implementation, during the transmit mode, the injected current 316 flowing at the upper loop 218 and the lower loop 220 may generate the magnetic field 322 that flows in the same direction. Further, the flux guide 302 may facilitate magnetic flux (e.g., magnetic flux 326) to generate the magnetic field 322.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A portable device comprising:
   a housing having at least one component positioned within the housing, the at least one component defining top and bottom surfaces;
   a continuous loop of coil antenna that includes an upper loop and a lower loop to form a figure-eight arrangement, the upper loop includes an opposite sense of rotation against the lower loop, wherein the coil antenna is wrapped to the top and bottom surfaces of the at least one component; and
   a flux guide installed between the component and the coil antenna, the flux guide at receive mode facilitates magnetic flux at the upper loop and the lower loop to induce current of the same phase, the flux guide at transmit mode facilitates the magnetic flux at the upper loop and the lower loop to generate magnetic fields of the same direction.

2. The portable device as recited in claim 1, wherein the coil antenna includes the figure-eight arrangement that is installed at an edge of a screen, or at an edge of a base of the portable device.

3. The portable device as recited in claim 1, wherein the coil antenna includes multiple coils to form the figure-eight arrangement.

4. The portable device as recited in claim 1, wherein the coil antenna includes the figure-eight arrangement that is wrapped around a corner of a base, or a corner of a screen of the portable device to read through front side, top side, bottom side, right side, or corner side of the portable device in tablet mode.

5. The portable device as recited in claim 1, wherein the coil antenna includes the figure-eight arrangement that is installed at an edge of a base, or at an edge of a screen of the portable device to read through top and bottom side in tablet mode.

6. The portable device as recited in claim 1, wherein the coil antenna includes the figure-eight arrangement that is installed at an edge or corner of a base, or at an edge or corner of a screen of the portable device to read through front and back side of the screen in clamshell mode.

7. The portable device as recited in claim 1, wherein the flux guide includes a ferrite material that captures and facilitates the magnetic flux at a receiving loop to penetrate and exit at the lower loop or the upper loop during the receive mode.

8. The portable device as recited in claim 1, wherein the flux guide during the receive mode captures and facilitates the magnetic flux that induces a current at a receiving loop in a counter-clockwise direction, wherein the facilitated magnetic flux penetrates and induces another current at the lower loop or the upper loop in a clockwise direction.

9. The portable device as recited in claim 1, wherein the flux guide includes both ends that are inserted into slots that are located at the upper loop and the lower loop of the coil antenna to receive incoming magnetic fields during the receive mode, wherein both ends of the flux guide are located on top of the component and the same side of the coil antenna, wherein a portion of the flux guide defined by a plane connecting the slots are located on top of the component on the other side of the coil antenna.

10. The portable device as recited in claim 1, wherein the portable device is selected from one of a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

11. A method of manufacturing a device to establish near field coupling comprising:
means for establishing a near field coupling at the device through a continuous loop of coil antenna forming a figure-eight arrangement, which includes an upper loop and a lower loop, the upper loop includes an opposite sense of rotation against the lower loop;
means for receiving incoming magnetic fields at receive mode through a flux guide that is installed between the coil antenna and at least one component that defines top and bottom surfaces, the flux guide facilitates magnetic flux at the upper loop and the lower loop to induce current of the same phase during the receive mode, the flux guide facilitates the magnetic flux at the upper loop and the lower loop to generate magnetic fields of the same direction at transmit mode.

12. The method as recited in claim 11, wherein the means for establishing near field coupling includes the coil antenna, which includes the figure-eight arrangement that is installed at an edge or corner of a screen, or at an edge or corner of a base of the device.

13. The method as recited in claim 11, wherein the means for establishing near field coupling includes the coil antenna that includes multiple coils to form the figure-eight arrangement.

14. The method as recited in claim 11, wherein establishing near field coupling includes the figure-eight arrangement coil antenna that is wrapped around a corner of a base, or a corner of a screen of the device to read through front side, top side, bottom side, right side, or corner side of the device in tablet mode.

15. The method as recited in claim 11, wherein the coil antenna includes the figure-eight arrangement that is installed at an edge of a base, or at an edge of a screen of the device to read through top and bottom side in tablet mode.

16. The portable device as recited in claim 11, wherein the coil antenna includes the figure-eight arrangement that is installed at an edge or corner of a base, or at an edge or corner of a screen of the device to read through front and back side of the screen in clamshell mode.

17. The portable device as recited in claim 11, wherein the flux guide includes a ferrite material that captures and facilitates the magnetic flux at a receiving loop to penetrate and exit at the lower loop or the upper loop during the receive mode.

18. The portable device as recited in claim 11, wherein the flux guide during the receive mode captures and facilitates the magnetic flux that induces a current at a receiving loop in a counter-clockwise direction, wherein the facilitated magnetic flux penetrates and induces another current at the lower loop or the upper loop in a clockwise direction.

19. The method as recited in claim 11, further comprising means for inserting both ends of the flux guide into slots located at the upper loop and the lower loop of the coil antenna to receive the incoming magnetic fields during the receive mode, wherein both ends of the flux guide are located on top of the component and the same side of the coil antenna, wherein a portion of the flux guide defined by a plane connecting the slots are located on top of the component and on the other side of the coil antenna.

20. A device comprising:
a continuous loop of coil antenna that includes an upper loop and a lower loop to form a figure-eight arrangement, the upper loop includes an opposite sense of rotation against the lower loop, wherein the coil antenna is wrapped to top and bottom surfaces defined by at least one component; and
a flux guide installed between the component and the coil antenna, the flux guide at receive mode facilitates magnetic flux at the upper loop and the lower loop to induce current of the same phase, the flux guide at transmit mode facilitates the magnetic flux at the upper loop and the lower loop to generate magnetic fields of the same direction.

21. The device as recited in claim 20, wherein the coil antenna includes the figure-eight arrangement that is installed at an edge or corner of a screen, or at an edge or corner of a base of the device.

22. The device as recited in claim 20, wherein the coil antenna includes multiple coils to form the figure-eight arrangement.

23. The device as recited in claim 20, wherein the coil antenna includes the figure-eight arrangement that is wrapped around a corner of a base, or a corner of a screen of the device to read through front side, top side, bottom side, right side, or corner side of the device in a tablet mode.

24. The device as recited in claim 20, wherein the coil antenna includes the figure-eight arrangement that is installed at an edge of a base, or at an edge of a screen of the device to read through top and bottom side in tablet mode.

25. The portable device as recited in claim 20, wherein the coil antenna includes the figure-eight arrangement that is installed at an edge or corner of a base, or at an edge or corner of a screen of the device to read through front and back side of the screen in clamshell mode.

26. The portable device as recited in claim 20, wherein the flux guide includes a ferrite material that captures and facilitates the magnetic flux at a receiving loop to penetrate and exit at the lower loop or the upper loop during the receive mode.

27. The device as recited in claim 20, wherein the flux guide during the receive mode captures and facilitates the magnetic flux that induces a current at a receiving loop in a counter-clockwise direction, wherein the facilitated magnetic flux penetrates and induces another current at the lower loop or the upper loop in a clockwise direction.

28. The device as recited in claim 20, wherein the flux guide includes both ends that are inserted into slots that are located at the upper loop and the lower loop of the coil antenna to receive incoming magnetic fields during the receive mode, wherein both ends of the flux guide are located on top of the component and the same side of the coil antenna, wherein a portion of the flux guide defined by a plane connecting the slots are located on top of the component but on the other side of the coil antenna.

29. The device as recited in claim 20, wherein the device is selected from one of a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

* * * * *